United States Patent [19]

Mann

[11] Patent Number: 5,033,931
[45] Date of Patent: Jul. 23, 1991

[54] HINGED TRAILER

[76] Inventor: Fred W. Mann, Box 444, Waterville, Kans. 66548

[21] Appl. No.: 485,211

[22] Filed: Feb. 26, 1990

[51] Int. Cl.$^5$ ............................................. B60P 1/24
[52] U.S. Cl. .............................. 414/480; 298/23 DF; 296/57.1; 296/61; 414/469
[58] Field of Search .............. 414/485, 469, 557, 472, 414/474, 476, 480, 555, 214; 280/14; 296/57.1, 61; 298/17 B, 22 B, 23 F, 23 S, 23 A, 23 DF, 23 B

[56] References Cited

U.S. PATENT DOCUMENTS

| | | | |
|---|---|---|---|
| 1,434,168 | 10/1922 | Thornton | 298/17 B |
| 2,552,713 | 5/1951 | Flower. | |
| 2,662,655 | 12/1953 | Sellers. | |
| 2,696,928 | 12/1954 | Faircloth et al. | 414/469 |
| 2,803,362 | 8/1957 | Saenz | 414/480 |
| 3,064,842 | 11/1962 | Haynie. | |
| 3,471,047 | 10/1969 | Burke. | |
| 3,799,373 | 3/1974 | Randall | 414/557 |
| 3,968,892 | 7/1976 | Spars | 414/537 X |
| 4,101,081 | 7/1978 | Ritter et al. | 414/555 X |
| 4,222,698 | 9/1980 | Baelter | 414/477 |
| 4,516,902 | 5/1985 | Matson | 414/480 |
| 4,630,991 | 12/1986 | Landoll et al. | 414/480 X |
| 4,730,974 | 3/1988 | Andre | 414/480 X |

FOREIGN PATENT DOCUMENTS

183345  7/1922  United Kingdom ................ 414/480

Primary Examiner—Frank E. Werner
Assistant Examiner—Brian Dinicola
Attorney, Agent, or Firm—Litman, McMahon & Brown

[57] ABSTRACT

A trailer having a hinged bed with a hinge positioned such that a rear bed portion automatically pivots toward the ground in an inclined load/unload position when the trailer is empty, forming a ramp for loading and unloading. The hinged bed automatically pivots to a horizontal transport position when a front portion of the bed is loaded. The trailer includes a transport locking mechanism for securing the rear bed portion in its horizontal transport position and a separate load/unload locking mechanism for securing the rear bed portion in its inclined load/unload position.

21 Claims, 3 Drawing Sheets

HINGED TRAILER

BACKGROUND OF THE INVENTION

The present invention relates generally to vehicles and more particularly to an improved trailer having a hinged bed with a rear portion that automatically pivots between load/unload and transport positions, facilitating equipment loading and unloading.

Trailers have long been used for transporting various loads, including equipment such as garden tractors, riding lawnmowers, motorcycles and the like. One type of trailer includes a tongue at the front for coupling with a tow truck or car and a hinged or removable rear portion that forms a ramp to be used during the loading and unloading of the trailer. However, an operator loading a trailer with a hinged or removable ramp may have to first place the trailer in a ramp-down loading position, load the the trailer (e.g. by driving equipment onto it) and then manually move the trailer ramp to a horizontal or vertical transport position. This is a time consuming process and the trailer ramp may be heavy and/or of an awkward size and therefore difficult for an operator to remove or adjust.

The problems of manual trailer ramp adjustment have been addressed by winch and cable devices and by hydraulic cylinder and piston devices that connect to both a trailer bed and a hinged loading ramp and are adapted for pivoting the ramp between load/unload and transport positions. The prior art includes trailers utilizing such devices for automatically pivoting their loading ramps to transport positions when equipment to be transported is driven onto the trailer beds.

Winch and cable or hydraulic cylinder and piston devices can adequately pivot hinged trailer ramps between load/unload and transport positions without undue physical exertion by operators. However, trailers equiped with such devices, and particularly devices that provide automatic ramp adjustment, are often complex in design, adding to the expense of initial trailer purchase and trailer maintenance.

SUMMARY OF THE INVENTION

In a preferred embodiment of the hinged trailer of this invention, a trailer bed includes a hinge positioned between a front end of the trailer and a trailer wheel axle such that when the trailer is empty, a rear portion of the bed behind the hinge is inclined toward the ground to form a ramp in a load/unload position. When weight is placed in front of the hinge on a front portion of the trailer, the ramp pivots about the wheel axle to a horizontal transport position.

In another embodiment, the hinged trailer of this invention has a hinged bed mounted on a frame. A rear portion of the hinged bed is pivotally mounted on a rear end of the frame and a forward end of a front portion of the hinged bed is slidingly mounted onto the frame so as to slide forward as weight is placed on the front portion of the bed, pivoting the rear portion of the bed to a horizontal transport position.

The hinged trailer of this invention is also equiped with two locking mechanisms: a first locking mechanism with a cam and a connecting rod for automatically securing the trailer in a transport position; and a second locking mechanism located on the connecting rod for securing the trailer in a load/unload ramp-down position for use when more than one piece of equipment is loaded onto or unloaded from the trailer.

OBJECTS OF THE INVENTION

Therefore, the objects of the present invention are: to provide an improved trailer, particularly well adapted for transporting wheeled equipment; to provide such a trailer that is not labor intensive; to provide such a trailer that includes a ramp that automatically lowers to a loading position when the trailer is empty and automatically pivots to a transport position when equipment is loaded onto the trailer; to provide such a trailer that pivots quickly and efficiently between the loading and transport positions; to provide such a trailer that is simple and inexpensive; to provide such a trailer that safely transports equipment loaded threon; to provide such a trailer that includes a mechanism to lock the ramp in a transport position; to provide such a trailer that includes a mechanism to lock the ramp in a load-/unload position when more than one piece of equipment is to be loaded or unloaded thereon; and to provide such a trailer that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in detail and particularly to FIGS. 1 through 9, a hinged trailer of this invention, generally designated by the reference numeral 1, includes a frame 5 mounted on an axle 7 having a pair of wheels 8 and extending at a front or forward end 10 to a tongue 12 for coupling with a towing vehicle such as a truck (not shown) having a hitch 15. It is foreseen that the trailer 1 may also be part of a vehicle such as a truck bed. The frame 5 supports an elongated bed 18. Pivoting means along a transverse axis such as illustrated by a hinge 20 located between the forward end of the frame 10 and the axle 7 separates the trailer 1 into a front portion 22 and a rear or ramp portion 23 with the rear portion 23 pivotal about a transverse axis 24 located in the center of axle 7.

Figure 1:
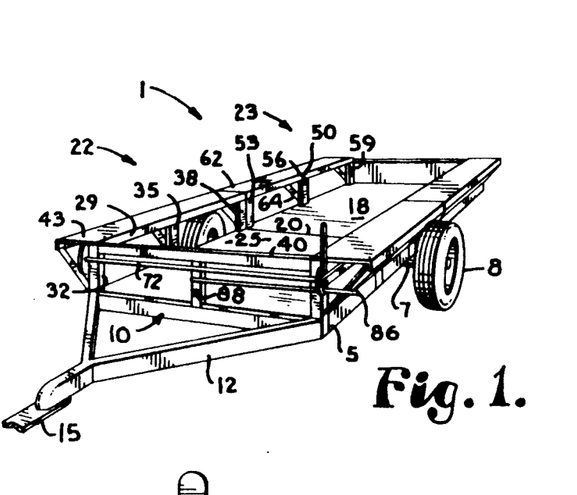
FIG. 1 is a perspective view of an embodiment of the hinged trailer in accordance with the present invention including a front portion, a rear portion or ramp, a transport or ramp-up locking mechanism and a load/unload or ramp-down locking mechanism; the ramp is shown in a locked ramp-up position.

The front portion 22 includes a first or front bed portion 25 mounted on a lower frame 26. A pair of longitudinally extending side rails 28 and 29 located above the front bed portion 25 and parallel to the sides of the lower frame 26 are fixedly connected to and supported by a framework including a pair of front support braces 31 and 32, middle support braces 34 and 35, and rear support braces 37 and 38 that are perpendicular and fixedly connected to the lower frame 26. The rear support braces 37 and 38 are located near hinge 20. A horizontal top cross bar 40 supports and connects front support braces 31 and 32 to each other. A pair of longitudinally extending guard rails 42 and 43 are fixedly mounted on the side rails 28 and 29 respectively and extend substantially along the length thereof and are supported by brackets 44 attached to the side rails 28 and 29 and to the lower frame 26 at locations where the lower frame 26 connects with support braces 31, 32, 34, 35, 37 and 38. An L-shaped bracket 45 is fixedly mounted to the outer surface of the middle support brace 34 and to the horizontal portion of a bracket 44.

Similarly, the rear or ramp portion 23 includes a second or rear bed portion or ramp 46 mounted on a lower frame 47. A pair of side rails 49 and 50 located above the bed portion 46 and parallel to the sides of the lower frame 47 are fixedly connected and supported by a framework including a pair of front support braces 52 and 53 a pair of middle support braces 55 and 56 and a pair of rear support braces 58 and 59 that are perpendicular and fixedly connected to the lower frame 47. The front support braces 52 and 53 of the rear portion 23 are located near the hinge 20. A plate 60 integral with support brace 52 extends laterally substantially along the length of the forward edge thereof. A pair of guard rails 61 and 62 are fixedly mounted on the side rails 49 and 50 respectively and extend substantially along the length thereof and are supported by brackets 64 attached to the side rails 49 and 50 and the lower frame 47 at locations where the lower frame 47 connects with support braces 52, 53, 55, 56, 58 and 59.

Figure 2:
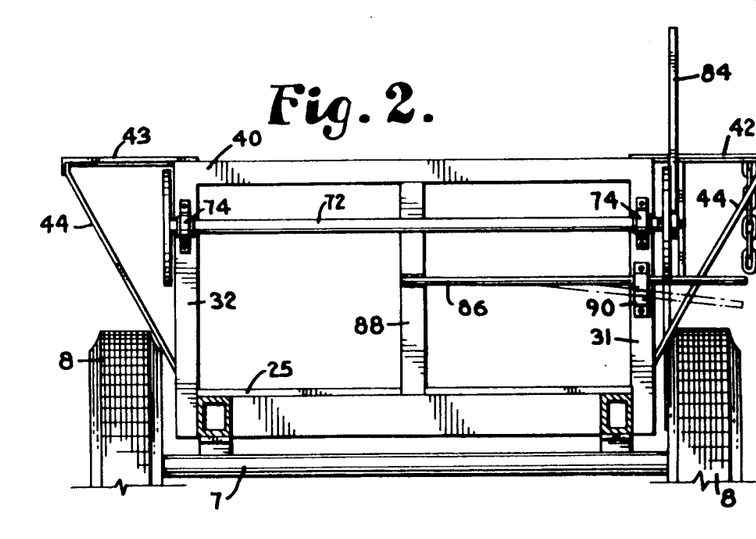
FIG. 2 is an enlarged front elevational view of the hinged trailer with the ramp-up locking mechanism shown in a locked position in solid lines and in an unlocked position in phantom lines.
Figure 3:
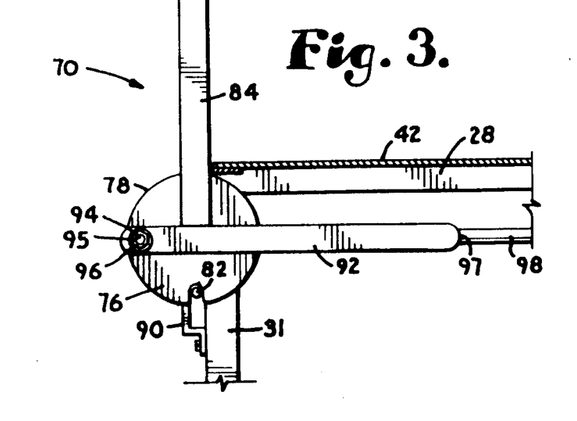
FIG. 3 is an enlarged fragmentary side elevational view of the ramp-up locking mechanism shown in a locked position.
Figure 4:
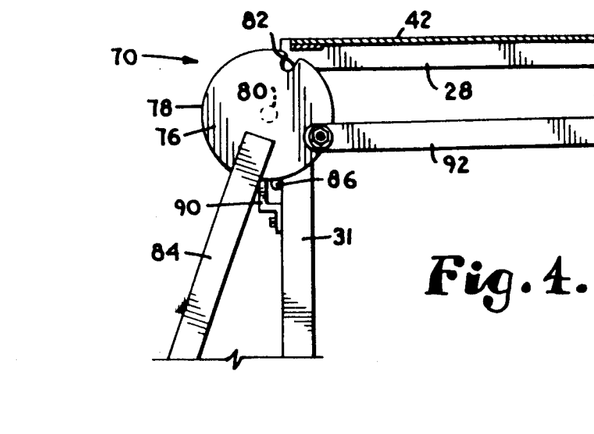
FIG. 4 is an enlarged fragmentary side elevational view of the ramp-up locking mechanism shown in an unlocked position.

A ramp-up cam lock mechanism, generally represented by the reference numeral 70 includes a horizontal cam shaft 72 slidingly mounted by brackets 74 to both front support braces 31 and 32 at the front end 10 of the trailer 1 near the top cross bar 40. A cam plate 76 having an outer radial surface 78 is fixedly connected to the cam shaft 72 at the center 80 thereof and located on the outer side of front support brace 31. The cam plate 76 has a U-shaped notch 82 located on the outer radial surface 78 and a lever 84 fixedly connected thereto extending radially opposite the notch 82. A transverse locking rod or bar 86 located generally below the cam shaft 72, fixedly connected to a central vertical support 88 extends through a support bracket 90 located on the front support bar 31 and the notch 82 restricting the rotation of the cam plate 76 and the cam shaft 72. The central vertical support 88 is fixedly connected to both the lower frame 26 and the top cross bar 40. The support bracket 90 does not hamper vertical movement of the semi-flexible rod 86 allowing manual adjustment of the rod 86 between a position lodged in the notch 82 and a position below the radial surface 78 of the cam plate 76 as shown in FIG. 2, so as to allow rotation of the cam plate 76.

A bar 92 is pivotally mounted on a bolt 94 extending through an aperature 95 on the cam plate 76 at a location near the radial outer surface 78 between the U-shaped notch 82 and the lever 84 and secured by a lock nut 96. The bar 92 is fixedly attached at an end 97 to a cam rod 98 that extends substantially longitudinally along the front portion 22 of the trailer 1 and slidingly through the L-shaped bracket 45 and an aperature 100 in the plate 60 of the rear portion 23 of the trailer 1. The inner diameter of the aperature 100 is substantially larger than the outer diameter of the cam rod 98 to compensate for the angular movement of both the plate 60 and the cam rod 98. A lock nut 101 secured to the end 102 of the cam rod 98 is adapted to keep the cam rod 98 positioned in the aperature 100.

Figure 7:
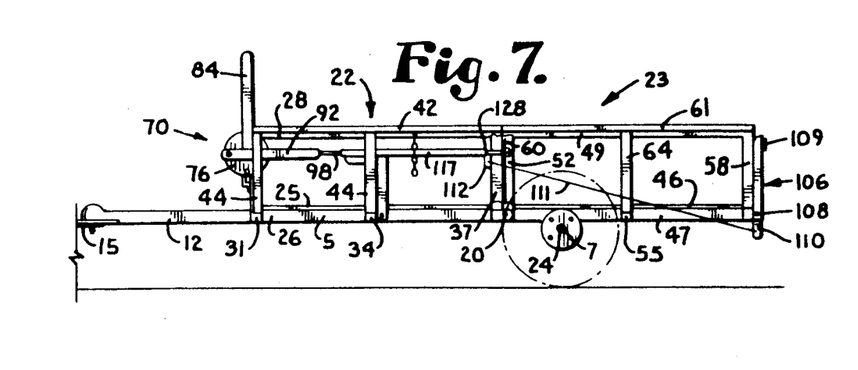
FIG. 7 is a side elevational view of the hinged trailer of this invention with the ramp shown in a transport position and the ramp-up locking mechanism shown in a locked position.

A tailgate mechanism 106 located at the rear or back end of the trailer 1 and pivotally connected to the lower frame 47 by a hinge 108 includes a bumper 109 fixedly attached thereto and a member 110 integral thereto extending below the lower frame 47 when the tail gate 106 is in a nearly vertical position. Linkage means located to one side of the trailer 1 such as illustrated by a rod 111 is pivotally attached to the tailgate member 110 and pivotally attached to a plate 112 fixedly attached to the rear support brace 37 of the front portion 22 of the trailer 1 thereby cooperating the tailgate mechanism 106 with the front portion 22. The length of the rod 111 is adapted such that the tail gate 106 pivots between a near vertical position adjacent to rear support members 58 and 59 when the rear portion 23 of the trailer 1 is in the horizontal transport position as shown in FIG. 7 and a slightly inclined position with the bumper 109 resting on the ground when the rear portion 23 of the trailer 1 is in a load/unload position as shown in FIG. 8.

A ramp-down locking mechanism, generally represented by the reference numeral 115 includes a cylindrical sleeve 117 surrounding a substantial portion of the cam rod 98 and slidable thereon. Fixedly attached to the sleeve 117 are a handle or lever 119 and a stop plate 121 located substantially near to each other and projecting radially from the sleeve 117 in the same direction, hanging vertically down therefrom when the ramp-down locking mechanism 115 is in an unlocked position. The end 123 of the lever 119 contains a groove 124. The stop plate 121 is trapazoidal in shape having a slanting forward edge 126. The stop plate 121 is located such that when the trailer 1 is in a load/unload position as illustrated in FIG. 8, and the sleeve 117 is manually slid along the cam rod 98 until an end 128 of the sleeve 117 abuts against the plate 60 on the rear portion 23, and the lever 119 and the stop plate 121 are manually rotated to a horizontal position, the forward edge 126 of the stop plate 121 abuts or wedges against the rearward edge of the L-shaped bracket 45. A locking means such as illustrated by a chain 130 is fixedly attached to the guard rail 42 hanging vertically therefrom and adapted to engage the groove 124 in the lever 119 when the lever is in a horizontal position, locking the trailer 1 in the load/unload ramp-down position as shown in FIG. 9.

In operation, the trailer 1 of this invention is used with a towing vehicle, such as a truck or tractor and most often used for transporting small equipment such as garden tractors and riding lawnmowers. If the trailer 1 is in the ramp-up locked position as shown if FIGS. 1 and 7, an operator must manually unlock the ramp-up cam lock mechanism 70 shown in detail in FIGS. 3 and 4 by pushing down on the horizontal locking rod 86 and unlodging it from the cam plate notch 82. The lever 84 can then be used to easily rotate the camplate 76 in a counter-clockwise direction, pressing the cam rod 98 against the plate 60 on the rear portion 23. The rear portion 23 freely pivots down about the transverse axis 24 to a loading position due to the weight thereof, rotating the cam-lock mechanism 70 to the position shown in FIG. 4. The pivoting of the rear portion 23 pulls the rod 111 forward which in turn pulls forward on the member 110 of the tailgate 106 pivoting the tailgate 106 to a position inclined toward the ground. A hydraulic piston and cylinder unit (not shown) may be connected to the front portion 22 and the rear portion 23 of the trailer 1 in order to control the speed of movement of the rear portion 23 to the ramp-down loading position.

Figure 8:
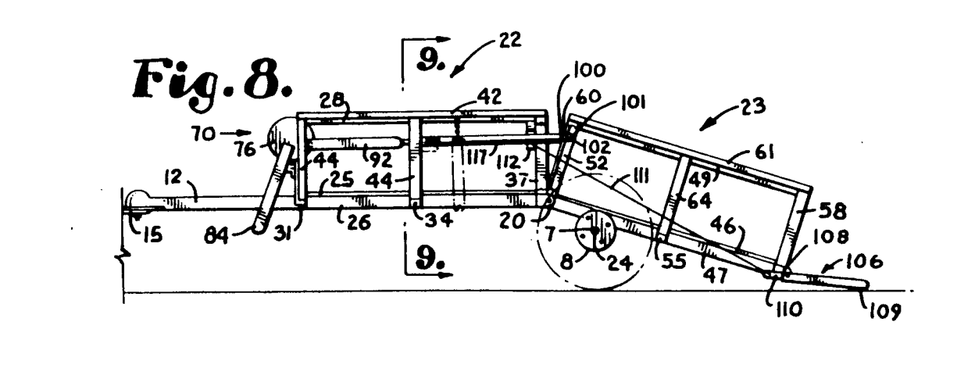
FIG. 8 is a side elevational view of the hinged trailer of this invention with the ramp shown in a load/unload position and the ramp-down locking mechanism shown in a locked position in solid lines and an unlocked position in phantom lines.

When the trailer 1 is in the loading position shown in FIG. 8, an operator may drive or otherwise load the equipment onto the trailer. As the equipment passes over the hinge 20 and onto the front bed portion 25, the weight of equipment causes the front portion 22 to lower and the rear portion 23 to pivot about the transverse axis 24 to a horizontal position with the front support braces 52 and 53 of the rear portion 23 abutting against the rear support braces 37 and 38 of the front portion 22. As the rear portion 23 pivots to a horizontal position, the cam rod 98 is pushed forward, rotating the cam plate 78 in a clockwise direction until the horizontal locking rod 86, automatically slides into the notch 82, locking the trailer 1 into the transport position. The pivoting of the rear portion 23 pushes the rod 111 rearward which in turn pushes the member 110 of the tailgate 106 in a rearward direction causing the tailgate 106 to pivot to a vertical position. As with the ramp-down movement to the loading position, a hydraulic piston and cylinder unit (not shown) may be utilized to control the speed of the movement of the rear portion 23 to the horizontal transport position.

Figure 5:
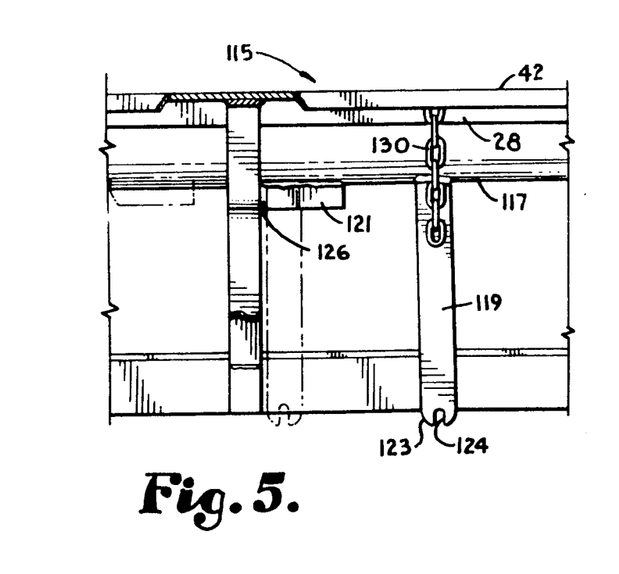
FIG. 5 is an enlarged, fragmentary side elevational view of the ramp-down locking mechanism shown in an unlocked load/unload ramp-down position in solid lines and a ramp-up position in phantom lines.
Figure 6:
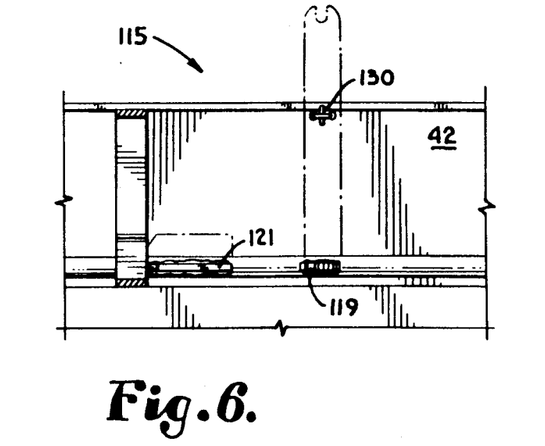
FIG. 6 is an enlarged, fragmentary, bottom plan view of the ramp-down locking mechanism shown in an unlocked ramp down position in solid lines and a locked ramp-down position in phantom lines.
Figures 9, 10, 11, 12:
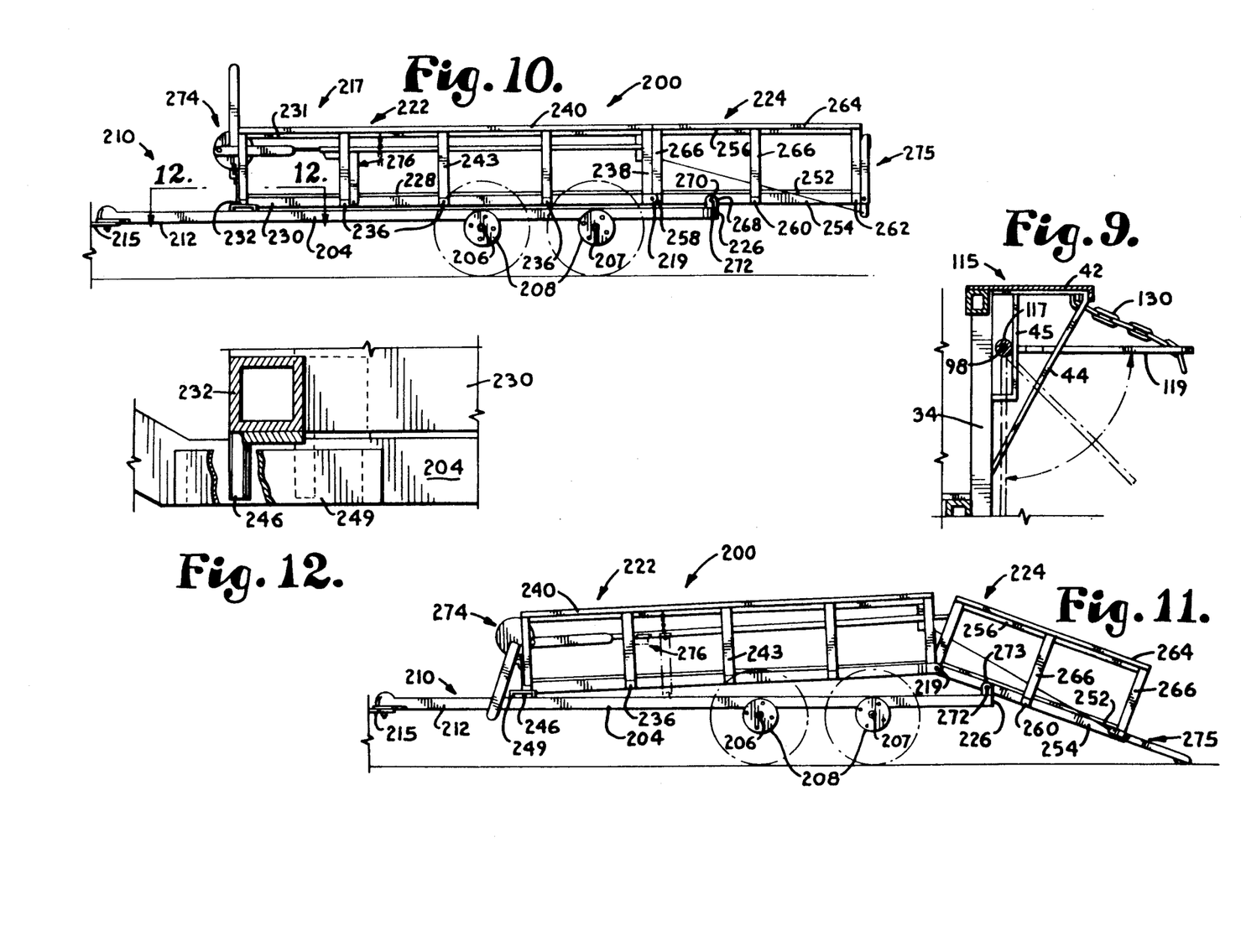
FIG. 9 is an enlarged fragmentary cross-sectional view of the ramp-down locking mechanism taken along 9—9 of FIG. 8 shown in a locked position in solid lines pivoting to an unlocked position in phantom lines.
FIG. 10 is a side elevational view of a second embodiment of the hinged trailer with the ramp shown in a transport position and the ramp-up locking mechanism in a locked position.
FIG. 11 is a side elevational view of the second embodiment of the hinged trailer with the ramp shown in a load/unload position with the ramp-down locking mechanism in a locked position in solid lines and in an unlocked position in phantom lines.
FIG. 12 is an enlarged fragmentary cross-sectional view of the second embodiment of the hinged trailer taken along 12—12 of FIG. 10.

If more than one piece of equipment is to be loaded onto the trailer 1, the rear portion 23 may be locked into the loading position by use of the ramp-down locking mechanism shown in FIGS. 5, 6 and 9. An operator must first slide the sleeve 117 toward the rear portion 23 until the end 128 of the sleeve 117 abuts against the plate 60. The operator then rotates the handle 119 from a vertical position to a horizontal position shown in FIG. 9 causing the forward edge 126 of the stop plate 121 to wedge against the rearward edge of the L-shaped bracket 45, locking the rear portion 23 in the loading position. The operator may then slide the chain 130 into the groove 124 in the handle 119 to hold the handle 119 in the horizontal locked position. After the last piece of equipment is loaded, the operator disengages the chain 130 from the handle 119 and lowers the handle 119 to a vertical position. The lower portion 23 then automatically pivots to a transport position, rotating the cam plate 76 until the horizontal locking rod 86 slides into the notch 82.

When unloading equipment, the procedure is reversed and the operator must first disengage the locking rod 86 from the notch 82 by pushing down on the rod 86. As the equipment crosses over the hinge 20, the rear portion 23 automatically pivots to a ramp-down unloading position. If more than one piece of equipment is to be unloaded, the ramp-down locking mechanism 115 may be utilized to keep the rear portion 23 from returning to a horizontal transport position after the first piece of equipment is unloaded. To convert an empty trailer 1 from a load/unload position to a transport position, an operator may rotate lever 84 in a clock-wise direction, pulling cam rod 98 in a forward direction, pivoting the rear portion into the transport position.

Another embodiment of the hinged trailer of this invention, generally designated by the reference numeral 200 is shown in FIGS. 10, 11 and 12. The trailer 200 includes a main frame 204 mounted on a pair of axles 206 and 207 each having a pair of wheels 208 and extending at a front or forward end 210 to a tongue 212 for coupling with a towing vehicle such as a truck (not shown) having a hitch 215. It is foreseen that the trailer 200 may also be part of a vehicle such as a truck bed. The main frame 204 supports a trailer bed unit, generally designated by the reference numeral 217 having a pivoting means along a transverse axis such as illustrated by a hinge 219 separating the unit 217 into a front portion 222 and a rear or ramp portion 224. The hinge 219 is generally located between the rear axle 207 and the rearward end 226 of the main frame 204 with the rear portion 224 generally pivotal about the rearward end 226.

The front portion 222 includes a first or front bed portion 228 mounted on a lower frame 230. A pair of longitudinally extending side rails 231 located above the bed 228 and parallel to the sides of the lower frame 230 are fixedly connected to and supported by a framework including a pair of front support braces 232, three pair of middle support braces 236 and a pair of rear support braces 238 that are perpendicular and fixedly connected to the lower frame 230. The rear support braces 238 are located near hinge 219. A horizontal top cross bar (not shown) similar to the horizontal top cross bar 40 of trailer 1, supports and connects front support braces 232 to each other. A pair of longitudinally extending guard rails 240 are fixedly mounted on the side rails 231 and extend substantially along the length thereof and are supported by brackets 243 attached to the side rails 231 and the lower frame 230 at locations where the lower frame 230 connects with support braces 232, 236 and 238.

A shaft 246 welded or otherwise fixedly attached to the front end of the lower frame 230 extending laterally from the base of each support brace 232 rests on the main frame 204 and is slidable thereon. The longitudinal sliding movement and the vertical movement of the shaft 246 is restricted by a C-shaped brace 249 fixedly mounted to the main frame 204 shown in FIG. 12. As will be described more fully in the following paragraphs, the brace 249 is positioned and sized to provide adequate space for the shaft 246 to slide to allow pivoting of the rear portion 224 between an inclined load/unload position and a horizontal transport position.

The rear portion 224 includes a second or rear bed portion or ramp 252 mounted on a lower frame 254. A pair of side rails 256 located above the bed portion 252 and parallel to the sides of the lower frame 254 are fixedly connected and supported by a framework including a pair of front support braces 258, a pair of middle support braces 260, and a pair of rear support braces 262 that are perpendicular and fixedly connected to the lower frame 254. The front support braces 258 are located near the hinge 219. A pair of guard rails 264 are fixedly mounted on the side rails 256 and extend substantially along the length thereof and are supported by brackets 266 attached to the side rails 256 and the lower frame 254 at locations where the lower frame 254 connects to support braces 158, 160 and 262.

A pair of rear portion supports 268 each having an aperture 270 are fixedly attached to the lower frame 204 at the rearward end 226 on each side of the trailer 200. Pivoting means such as bolts 272 slidingly extend through the apertures 270 and through apertures (not shown) located on each side of the lower frame 254 of the rear portion 224 positioned generally between the front support braces 258 and the middle support braces 260. The rear portion 224 is pivotable about a transverse axis 273 and supported by the bolts 272.

The second embodiment 200 of the trailer of this invention also includes a ramp-up cam lock mechanism generally represented by the reference numeral 274, a tail gate mechanism generally represented by the reference numeral 275 and a ramp-down locking mechanism generally represented by the reference numeral 276. The ramp-up cam lock mechanism 274, tailgate mechanism 275 and ramp-down locking mechanism 276 are identical to the respective rampup cam lock mechanism 70, tailgate mechanism 106 and rampdown locking mechanism 115 of the first embodiment 1 of the invention. The front portion 222 and rear portion 224 of the second embodiment 200 are equipped with features identical to that described for front portion 22 and rear portion 24 of the first embodiment 1 in order to facilitate and support the ramp-up cam lock mechanism 274, tailgate mechanism 275 and ramp-down locking mechanism 276.

In operation, the trailer 200 of this invention is used with a towing vehicle, such as a truck or tractor and may be used for transporting large and small equipment. The operation of the cam lock mechanism 274, tailgate mechanism 275 and the ramp-down locking mechanism 276 are identical to the operations of the cam lock mechanism 70, tailgate mechanism 106 and the ramp-down locking mechanism 115 of the first embodiment 1 of the invention.

If the trailer 200 is in the ramp-up locked position as shown in FIG. 10, an operator must manually unlock the ramp-up cam lock mechanism 274. The rear portion 224 then freely pivots at bolts 270 about the transverse axis 273 to a position inclined toward the ground with the tailgate mechanism 275 touching the ground. As the rear portion 224 pivots between the horizontal and inclined positions, the trailer 200 bends at hinge 219 raising the front portion 222 and sliding the shaft 246 in a rearward direction on the main frame 204. If more than one piece of equipment is to be loaded or unloaded, the rear portion 224 may be locked into the inclined position by use of the ramp-down locking mechanism 176.

When the trailer 200 is in the loading position shown in FIG. 11, an operator may drive or otherwise load equipment onto the trailer. As the equipment passes over the hinge 219 and onto the front bed portion 228, the weight of the equipment causes the shaft 246 to slide forward, pivoting the rear portion 224 to a horizontal position and the tailgate mechanism 275 to a vertical position.

It is to be understood that while certain forms of the present invention have been illustrated and described herein, it is not to be limited to the specific forms or arrangement of parts described and shown.

What is claimed and desired to be secured by Letters Patent is as follows:

1. A vehicle comprising:
  (a) a bed having a front portion and a rear portion;
  (b) wheel means supporting said bed; said rear portion positioned above said wheel means and extending forwardly therefrom; and
  (c) hinge means pivotally connecting said front portion to said rear portion; said rear portion being pivotal between a load/unload position inclined downwardly and rearwardly from said front portion and a transport position with said bed portions generally horizontally aligned; said front portion remaining generally horizontal when said rear portion is in said load/unload position; said rear portion being adapted to automatically pivot from said load/unload position to said transport position by force of gravity when a load presses down upon said rear portion that is forward of said wheel means and presses down upon said front portion and to automatically pivot from said transport position to said load/unload position when the load is removed from said front portion and said rear portion located forward of said wheel means.

2. The vehicle according to claim 1, wherein:
  (a) said front portion includes a forward end;
  (b) said wheel means includes a first transverse axis; and
  (c) said hinge means includes a second transverse axis located between said forward end and said first transverse axis and in spaced relation thereto; said rear portion pivoting with respect to said front portion at said second transverse axis simultaneously with said rear portion pivoting about said first transverse axis.

3. The vehicle according to claim 1, including:
(a) tailgate means hingedly connected to said rear portion; and
(b) linkage means connected to said tailgate means and adapted to pivot said tailgate means between an inclined position extending downwardly and rearwardly from said rear portion when said rear portion is in said load/unload position and a generally vertical position when said rear portion is in said transport position.

4. The vehicle according to claim 1, including:
(a) first locking means for securing said rear portion in said transport position; and
(b) second locking means for securing said rear portion in said load/unload position.

5. A vehicle comprising:
(a) a bed having a front portion and a rear portion; said front portion including a front frame, a forward end and a rearward end; said rear portion including a rear frame;
(b) wheel means supporting said bed; said wheel means including a first transverse axis; and
(c) hinge means pivotally connecting said front portion to said rear portion along a second transverse axis; said second transverse axis being located between said forward end and said first transverse axis and in spaced relation thereto; said rear portion being pivotal about said first transverse axis between a load/unload position inclined downwardly and rearwardly from said front portion and a transport position with said bed portions generally horizontally aligned; said front portion remaining generally horizontal when said rear portion is in said load/unload position.

6. The vehicle according to claim 5 including:
(a) tailgate means hingedly attached to said rear portion; and
(b) linkage means connected to said tailgate means and adapted to pivot said tailgate means between an inclined position extending downwardly and rearwardly from said rear portion when said rear portion is in said load/unload position and a generally vertical position when said rear portion is in said transport position.

7. The vehicle according to claim 6 wherein:
(a) said tailgate means includes a projection fixedly attached thereto and extending below said rear frame when said tailgate means is in a vertical position; and
(b) said linkage means includes a bar pivotally connected to said rearward end and pivotally connected to said projection.

8. The vehicle according to claim 7 including:
(a) first locking means for securing said rear portion in said transport position; and
(b) second locking means for securing said rear portion in said load/unload position.

9. The vehicle according to claim 8 wherein said first locking means includes:
(a) a transverse cam shaft slidingly mounted on said front frame at said forward end;
(b) a rotatable cam plate having a notch; said cam plate fixedly attached to said cam shaft;
(c) a connecting rod pivotally attached to said cam plate extending generally longitudinally between said forward end and said rear frame and pivotally attached to said rear frame; said connecting rod adapted to move longitudinally, rotating said cam plate when said rear portion pivots between said load/unload position and said transport position; and
(d) a flexible locking rod fixedly mounted to said front frame at said forward end and located generally below said cam shaft; said locking rod adapted to lodge within said notch when said rear portion is in said transport position.

10. A vehicle comprising:
(a) a bed having a front portion and a rear portion; said front portion including a front frame, a forward end and a rearward end; said rear portion including a rear frame;
(b) wheel means supporting said bed; said wheel means including a first transverse axis;
(c) hinge means pivotally connecting said front portion to said rear portion along a second transverse axis; said second transverse axis being located between said forward end and said first transverse axis and in spaced relation thereto; said rear portion being pivotal about said first transverse axis between a load/unload position inclined downwardly and rearwardly from said front portion and a transport position with said bed portions generally aligned;
(d) tailgate means hingedly attached to said rear portion;
(e) linkage means connected to said tailgate means and adapted to pivot said tailgate means between and included position extending downwardly and rearwardly from said rear portion when said rear portion is in said load/unload position and a generally vertical position when said rear portion is in said transport position;
(f) said tailgate means including a projection fixedly attached thereto and extending below said rear frame when said tailgate means is in a vertical position;
(g) said linkage means including a bar including a bar pivotally connected to said rearward end and pivotally connected to said projectory;
(h) first locking means for securing said rear portion in said transport position;
(i) second locking means for securing said rear portion in said load/unload position; and
(j) said first locking means including:
(1) a transverse cam shaft slidingly mounted on said front frame at said forward end;
(2) a rotatable cam plate having a notch; said cam plate fixedly attached to said cam shaft;
(3) a connecting rod pivotally attached to said cam plate extending generally longitudinally between said forward end and said rear frame and pivotally attached to said rear frame; said connecting rod adapted to move longitudinally, rotating said cam plate when said rear portion pivots between said load/unload position; and
(4) a flexible locking rod fixedly mounted to said front frame at said forward end and located generally below said cam shaft; said locking rod adapted to lodge within said notch when said rear portion is in said transport position.

11. The vehicle according to claim 2 wherein said second locking means includes:
(a) a bracket fixedly attached to said front frame; and (b) a sleeve having a stop plate fixedly attached thereto; said sleeve surrounding and slidable upon said connecting rod and adapted to abut against said rear frame at an end thereof when said rear portion is in said load/unload position; said sleeve adapted to rotate about said connecting rod until said stop plate is wedged against said bracket when said rear portion is in said load/unload position locking said rear portion in said load/unload position.

12. The vehicle according to claim 10 including:
(a) a lever fixedly attached to said cam plate and adapted for manual rotation of said cam plate to pull said connecting rod in a forward direction and pivot said rear portion from said load/unload position to said transport position when said bed is empty.

13. A vehicle comprising:
(a) a bed having a front portion and a rear portion; said front portion including a front frame a forward end and a rearward end; said rear portion including a rear frame and a back end;
(b) wheel means supporting said bed; said wheel means including a first transverse axis;
(c) a hinge pivotally connecting said front portion to said rear portion along a second transverse axis; said second transverse axis being located between said forward end and said first transverse axis and in spaced relation thereto; said rear portion being pivotal about said first transverse axis between a load/unload position inclined downwardly and rearwardly from said front portion and a transport position with said bed portions generally aligned; said rear portion being adapted to automatically pivot from said load/unload position to said transport position when a load is placed on said bed between said first transverse axis and said forward end and to automatically pivot from said transport position to said load/unload position when the load is placed on said rear portion of said bed between said first transverse axis and said back end;
(d) a tailgate hingedly attached to said rear portion; said tailgate having a projection fixedly attached thereto and extending below said rear frame when said tailgate is in a vertical position;
(e) a linkage bar pivotally connected to said rearward end and pivotally connected to said projection; said linkage bar being adapted to pivot said tailgate between an inclined position extending downwardly and rearwardly from said rear portion when said rear portion is in said load/unload position and a generally vertical position when said rear portion is in said transport position;
(f) first locking means for securing said rear portion in said transport position including:
   (1) a transverse cam shaft slidingly mounted on said front frame at said forward end;
   (2) a rotatable cam plate cam plate fixedly attached to said cam shaft;
   (3) a connecting rod pivotally attached to said cam plate extending generally longitudinally between said forward end and said rear portion and pivotally attached to said rear frame; said connecting rod adapted to move longitudinally, rotating said cam plate when said rear portion pivots between said load/unload position and said transport position; and
   (4) a flexible locking rod fixedly mounted to said front frame at said forward end and located generally below said cam shaft; said locking rod adapted to lodge within said notch when said rear portion is in said transport position;
(g) a lever fixedly attached to said cam plate and adapted for manual rotation of said cam plate to pull said connecting rod in a forward direction and pivot said rear portion from said load/unload position to said transport position when said bed is empty; and
(h) second locking means for securing said rear portion in said loading position including:
   (1) a bracket fixedly attached to said front frame; and
   (2) a sleeve having a handle and stop plate fixedly attached thereto; said sleeve surrounding and slidable upon said connecting rod and adapted to abut against said rear frame at an end thereof when said rear portion is in said load/unload position; said handle being adapted to rotate said sleeve about said connecting rod until said stop plate is wedged against said bracket when said rear portion is in said load/unload position, locking said rear portion in said load/unload position.

14. A vehicle comprising:
(a) a chassis having a front portion and a rear portion;
(b) wheel means supporting said chassis;
(c) a first bed having a first frame a forward end and a rearward end; said forward end slidingly mounted on said front portion;
(d) a second bed having a second frame; said second bed being pivotally mounted on said rear portion and pivotal thereabout along a first transverse axis; and
(e) hinge means pivotally connecting said first bed to said second bed along a second transverse axis; said second transverse axis being located between said forward end and said first transverse axis and in spaced relation thereto; said second bed being pivotal about said first transverse axis between a load/unload position inclined downwardly and rearwardly from said first bed and a transport position with said second bed generally aligned with said first bed.

15. The vehicle according to claim 14 including:
(a) tailgate means hingedly attached to said second bed; and
(b) linkage means connected to said tailgate means and adapted to pivot said tailgate means between an inclined position extending downwardly and rearwardly from said second bed when said second bed is in said load/unload position and a generally vertical position when said second bed is in said transport position.

16. The vehicle according to claim 15 wherein:
(a) said tailgate means includes a projection fixedly attached thereto and extending below said rear portion when said tailgate means is in a vertical position; and
(b) said linkage means includes a bar pivotally connected to said rearward end and pivotally connected to said projection.

17. The vehicle according to claim 14 including:
(a) first locking means for securing said second bed in said transport position; and (b) second locking means for securing said second bed in said load/unload position.

18. The vehicle according to claim 17 wherein said first locking means includes:
   (a) a transverse cam shaft slidingly mounted on said first frame at said forward end;
   (b) a rotatable cam plate having a notch; said cam plate fixedly attached to said cam shaft;
   (c) a connecting rod pivotally attached to said cam plate extending generally longitudinally between said forward end and said second bed and pivotally attached to said second frame; said connecting rod being adapted to move longitudinally, rotating said cam plate when said second bed pivots between said load/unload position and said transport position; and
   (d) a flexible locking rod fixedly mounted to said first frame at said forward end and located generally below said cam shaft; said locking rod being adapted to lodge within said notch when said second bed is in said transport position.

19. The vehicle according to claim 18 wherein said second locking means includes:
   (a) a bracket fixedly attached to said first frame; and
   (b) a sleeve having a stop plate fixedly attached thereto; said sleeve surrounding and being slidable upon said connecting rod and adapted to abut against said second frame at an end thereof when said second bed is in said load/unload position; said sleeve being adapted to rotate about said connecting rod until said stop plate is wedged against said bracket when said second bed is in said load/unload position, locking said rear portion in said load/unload position.

20. The vehicle according to claim 18 including:
   (a) a lever fixedly attached to said cam plate and adapted for manual rotation of said cam plate to pull said connecting rod in a forward direction and pivot said second bed from said load/unload position to said transport position when said bed is empty.

21. A vehicle comprising:
   (a) a chassis having a front portion and a rear portion;
   (b) wheel means supporting said chassis;
   (c) a first bed having a first frame a forward end and a rearward end; said forward end being slidingly mounted on said front portion;
   (d) a second bed having a second frame and a back end; said second bed being pivotally mounted on said rear portion and being pivotal thereabout along a first transverse axis; and
   (e) a hinge pivotally connecting said first bed to said second bed along a second transverse axis; said second transverse axis being located between said forward end and said first transverse axis and in spaced relation thereto; said second bed being pivotal about said first transverse axis between a load/unload position inclined downwardly and rearwardly from said first bed and a transport position with said second bed generally aligned with said first bed; said second bed being adapted to automatically pivot from said load/unload position to said transport position when a load is placed between said first transverse axis and said forward end and to automatically pivot from said transport position to said load/unload position when the load is placed between said first transverse axis and said back end;
   (f) a tailgate hingedly attached to said second bed; said tailgate having a projection fixedly attached thereto and extending below said rear portion when said tailgate is in a vertical position;
   (g) a linkage bar pivotally connected to said rearward end and pivotally connected to said projection; said linkage bar being adapted to pivot said tailgate between an inclined position extending downwardly and rearwardly from said second bed when said second bed is in said load/unload position and a generally vertical position when said second bed is in said transport position.
   (h) first locking means for securing said second bed in said transport position including:
      (1) a transverse cam shaft slidingly mounted on said first bed at said forward end;
      (2) a rotatable cam plate having a notch; said cam plate being fixedly attached to said cam shaft;
      (3) a connecting rod pivotally attached to said cam plate extending generally longitudinally between said forward end and said second bed and pivotally attached to said second frame; said connecting rod being adapted to move longitudinally, rotating said cam plate when said second bed pivots between said load/unload position and said transport position; and
      (4) a flexible locking rod fixedly mounted to said first frame at said forward end and located generally below said cam shaft; said locking rod being adapted to lodge within said notch when said second bed is in said transport position;
   (i) a lever fixedly attached to said cam plate and adapted for manual rotation of said cam plate to pull said connecting rod in a forward direction and pivot said second bed from said load/unload position to said transport position when said bed is empty; and
   (j) a second locking means for securing said second bed in said load/unload position including:
      (1) a bracket fixedly attached to said first frame; and
      (2) a sleeve having a handle and a stop plate fixedly attached thereto; said sleeve surrounding and being slidable upon said connecting rod and being adapted to abut against said second frame at an end thereof when said second bed is in said load/unload position; said handle being adapted to rotate said sleeve about said connecting rod until said stop plate is wedged against said bracket when said second bed is in said load/unload position, locking said rear portion in said load/unload position.

* * * * *